US008818110B2

(12) United States Patent
Misawa

(10) Patent No.: US 8,818,110 B2
(45) Date of Patent: Aug. 26, 2014

(54) IMAGE PROCESSING APPARATUS THAT GROUPS OBJECT IMAGES BASED ON OBJECT ATTRIBUTE, AND METHOD FOR CONTROLLING THE SAME

(75) Inventor: Reiji Misawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1054 days.

(21) Appl. No.: 12/429,613

(22) Filed: Apr. 24, 2009

(65) Prior Publication Data

US 2009/0279793 A1 Nov. 12, 2009

(30) Foreign Application Priority Data

May 8, 2008 (JP) ................................. 2008-122776

(51) Int. Cl.
*G06K 9/62* (2006.01)
*G06K 9/00* (2006.01)

(52) U.S. Cl.
CPC ................................. *G06K 9/00456* (2013.01)
USPC .......................... 382/224; 382/173; 358/462

(58) Field of Classification Search
USPC ......................................................... 382/224
See application file for complete search history.

(56) References Cited

U.S. PATENT DOCUMENTS

| 5,491,760 | A | * | 2/1996 | Withgott et al. | 382/203 |
| 5,588,072 | A | * | 12/1996 | Wang | 382/176 |
| 5,731,805 | A | * | 3/1998 | Tognazzini et al. | 345/156 |
| 5,867,277 | A | * | 2/1999 | Melen et al. | 358/296 |
| 5,892,843 | A | * | 4/1999 | Zhou et al. | 382/176 |
| 5,966,455 | A | * | 10/1999 | Saito | 382/112 |
| 5,999,664 | A | * | 12/1999 | Mahoney et al. | 382/305 |
| 6,169,998 | B1 | * | 1/2001 | Iwasaki et al. | 715/202 |
| 6,185,329 | B1 | * | 2/2001 | Zhang et al. | 382/176 |
| 6,470,095 | B2 | * | 10/2002 | Mahoney et al. | 382/199 |
| 6,510,243 | B1 | * | 1/2003 | Ikeda | 382/173 |
| 6,693,718 | B1 | * | 2/2004 | Takaoka | 358/1.15 |
| 6,982,811 | B2 | * | 1/2006 | Sato | 358/1.4 |
| 7,321,445 | B2 | * | 1/2008 | Sato | 358/1.4 |
| 7,321,687 | B2 | * | 1/2008 | Yamamoto | 382/170 |

(Continued)

FOREIGN PATENT DOCUMENTS

| JP | 08-235349 A | 9/1996 |
| JP | 2001-358857 A | 12/2001 |

(Continued)

OTHER PUBLICATIONS

Japanese Office Action, dated Jun. 8, 2012, issued by the Japanese Patent Office, in Japanese Patent Application No. 2008-122776.

*Primary Examiner* — Gandhi Thirugnanam
(74) *Attorney, Agent, or Firm* — Fitzpatrick, Cella, Harper & Scinto

(57) ABSTRACT

In order to provide technology with which objects in image data can be managed in a further appropriate unit, an image processing apparatus includes an input unit for inputting image data; a detection unit that detects object images included in the input image data; a determination unit that determines an object attribute for each of the detected object images; a storage control unit that groups each of the detected object images based on the determined object attributes, and stores region information regarding the detected object images in a unit of the grouping in association with the image data in a storage unit; a dividing determination unit that determines whether or not to divide the grouped object images; and a dividing unit that extracts an individual object image from the grouped object images.

7 Claims, 20 Drawing Sheets

(56) References Cited

U.S. PATENT DOCUMENTS

| | | | |
|---|---|---|---|
| 7,349,577 B2* | 3/2008 | Kaneda et al. | 382/190 |
| 7,391,917 B2* | 6/2008 | Ohta et al. | 382/253 |
| 7,612,913 B2* | 11/2009 | Matsuzaki et al. | 358/1.9 |
| 7,657,100 B2* | 2/2010 | Gokturk et al. | 382/209 |
| 7,961,987 B2* | 6/2011 | Goodwin et al. | 382/309 |
| 8,023,738 B1* | 9/2011 | Goodwin et al. | 382/175 |
| 8,166,010 B2* | 4/2012 | Ives | 707/705 |
| 2002/0031283 A1* | 3/2002 | Yamazaki | 382/311 |
| 2004/0223197 A1* | 11/2004 | Ohta et al. | 358/538 |
| 2004/0247206 A1* | 12/2004 | Kaneda et al. | 382/305 |
| 2005/0105148 A1* | 5/2005 | Misawa | 358/537 |
| 2006/0045386 A1* | 3/2006 | Fukuoka et al. | 382/305 |
| 2007/0297671 A1* | 12/2007 | Yamamoto | 382/170 |
| 2008/0077847 A1* | 3/2008 | Dejean | 715/229 |
| 2009/0274369 A1* | 11/2009 | Sano et al. | 382/182 |
| 2009/0279793 A1* | 11/2009 | Misawa | 382/224 |
| 2009/0284800 A1* | 11/2009 | Misawa | 358/3.24 |
| 2009/0297033 A1* | 12/2009 | Ito et al. | 382/197 |
| 2010/0174979 A1* | 7/2010 | Mansfield et al. | 715/234 |
| 2011/0052062 A1* | 3/2011 | Chiu et al. | 382/176 |

FOREIGN PATENT DOCUMENTS

| | | |
|---|---|---|
| JP | 2003-263642 A | 9/2003 |
| JP | 2004-30430 A | 1/2004 |
| JP | 2004-326490 A | 11/2004 |

* cited by examiner

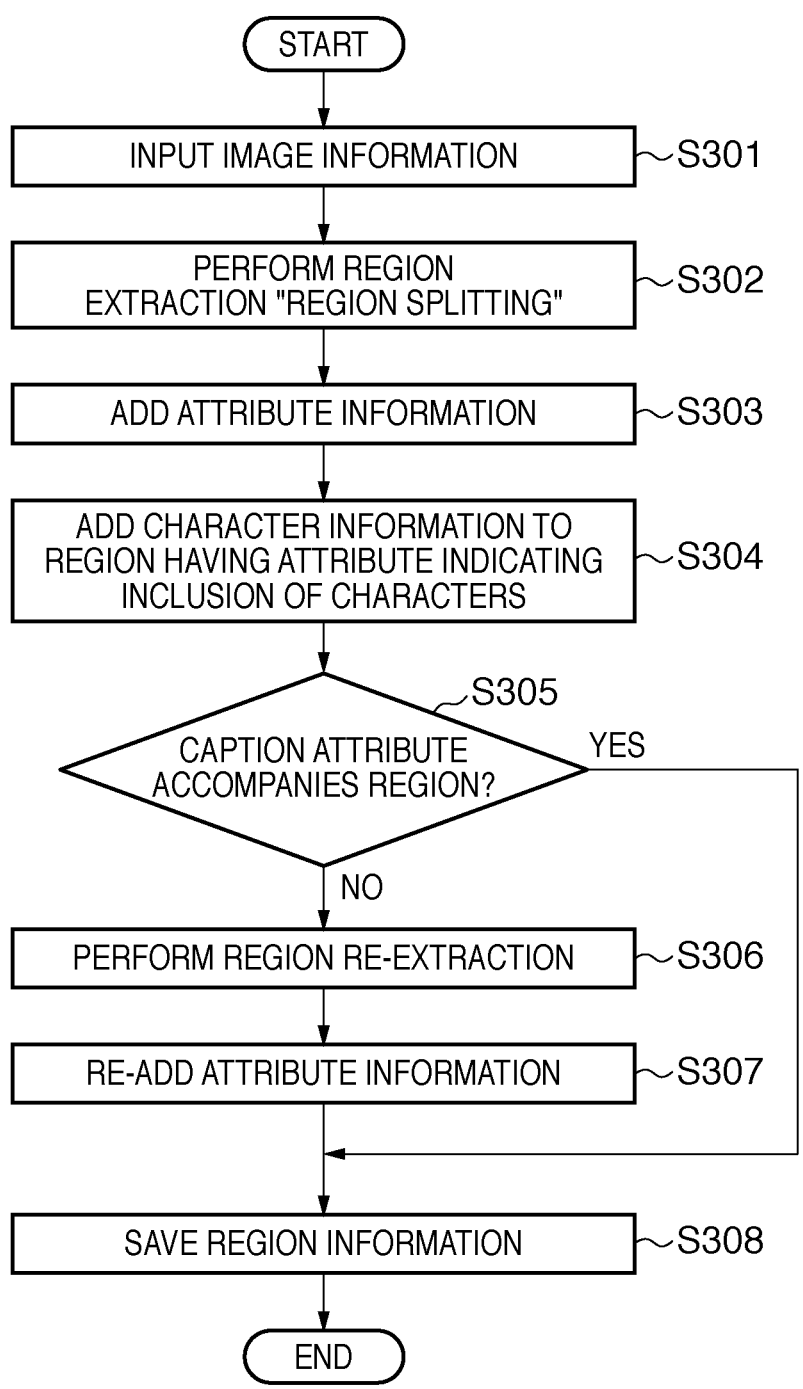

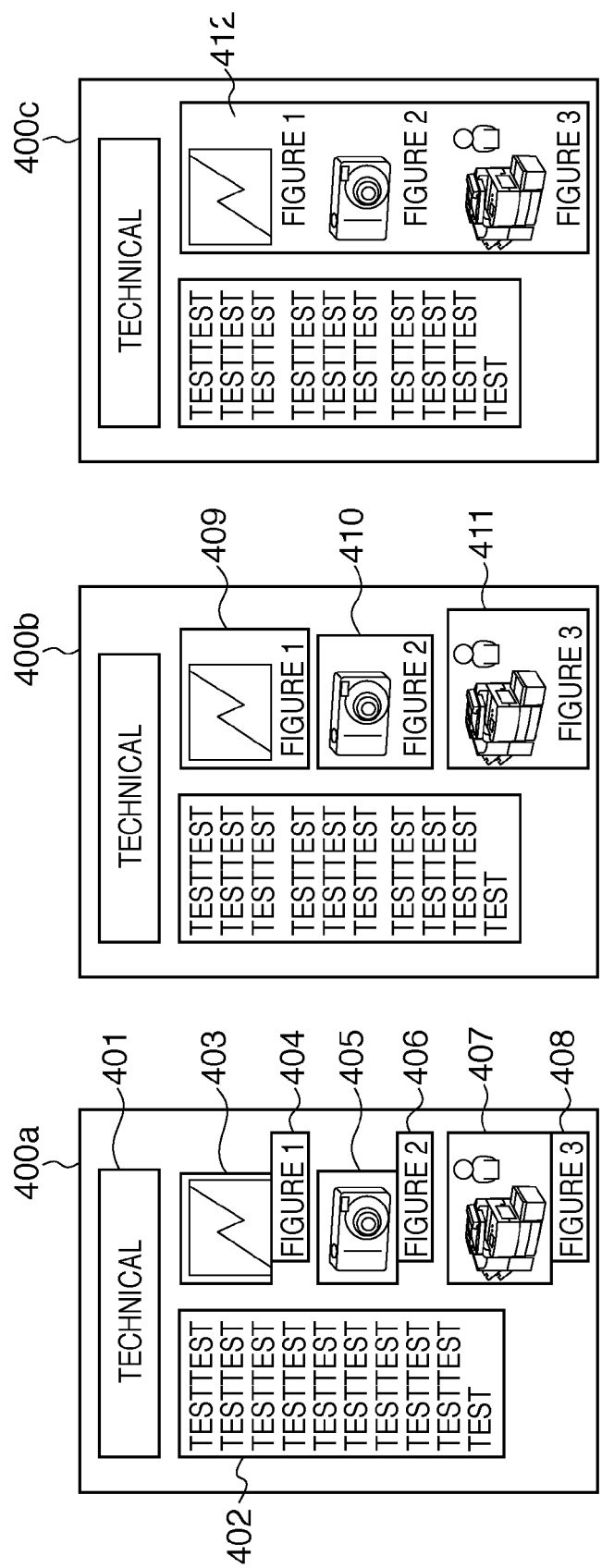

FIG. 5A

| REGION NUMBER | ATTRIBUTE INFORMATION | RECTANGLE INFORMATION "X COORDINATE VALUE, Y COORDINATE VALUE, WIDTH, HEIGHT" | CHARACTER RECOGNITION INFORMATION |
|---|---|---|---|
| 01 | "HEADING" | "X1 Y1 W1 H1" | "TECHNICAL" |
| 02 | "BODY" | "X2 Y2 W2 H2" | "TESTTESTTEST…" |
| 03 | "GRAPH" | "X3 Y3 W3 H3" | |
| 04 | "CAPTION" | "X4 Y4 W4 H4" | "FIGURE 1" |
| 05 | "IMAGE" | "X5 Y5 W5 H5" | |
| 06 | "CAPTION" | "X6 Y6 W6 H6" | "FIGURE 2" |
| 07 | "IMAGE" | "X7 Y7 W7 H7" | |
| 08 | "CAPTION" | "X8 Y8 W8 H8" | "FIGURE 3" |

~501

F I G. 5B

| REGION NUMBER | ATTRIBUTE INFORMATION | RECTANGLE INFORMATION "X COORDINATE VALUE, Y COORDINATE VALUE, WIDTH, HEIGHT" | CHARACTER RECOGNITION INFORMATION | ADDITIONAL INFORMATION |
|---|---|---|---|---|
| 01 | "HEADING" | "X1 Y1 W1 H1" | "TECHNICAL" | |
| 02 | "BODY" | "X2 Y2 W2 H2" | "TESTTESTTEST…" | |
| 03 | "GRAPH" | "X3 Y3 W3 H3" | | "FIGURE 1" |
| 04 | "CAPTION" | "X4 Y4 W4 H4" | "FIGURE 1" | |
| 05 | "IMAGE" | "X5 Y5 W5 H5" | | "FIGURE 2" |
| 06 | "CAPTION" | "X6 Y6 W6 H6" | "FIGURE 2" | |
| 07 | "IMAGE" | "X7 Y7 W7 H7" | | "FIGURE 3" |
| 08 | "CAPTION" | "X8 Y8 W8 H8" | "FIGURE 3" | |

502

F I G. 5C

503

| REGION NUMBER | ATTRIBUTE INFORMATION | RECTANGLE INFORMATION "X COORDINATE VALUE, Y COORDINATE VALUE, WIDTH, HEIGHT" | CHARACTER RECOGNITION INFORMATION | ADDITIONAL INFORMATION |
|---|---|---|---|---|
| 01 | "HEADING" | "X1 Y1 W1 H1" | "TECHNICAL" | |
| 02 | "BODY" | "X2 Y2 W2 H2" | "TESTTESTTEST..." | |
| 03 | "GRAPH" | "X3 Y3 W3 H3" | | "FIGURE 1" |
| 04 | "IMAGE" | "X5 Y5 W5 H5" | | "FIGURE 2" |
| 05 | "IMAGE" | "X7 Y7 W7 H7" | | "FIGURE 3" |

504

| REGION NUMBER | ATTRIBUTE INFORMATION | RECTANGLE INFORMATION "X COORDINATE VALUE, Y COORDINATE VALUE, WIDTH, HEIGHT" | CHARACTER RECOGNITION INFORMATION | ADDITIONAL INFORMATION |
|---|---|---|---|---|
| 01 | "HEADING" | "X1 Y1 W1 H1" | "TECHNICAL" | |
| 02 | "BODY" | "X2 Y2 W2 H2" | "TESTTESTTEST..." | |
| 03 | "GRAPH" | "X9 Y9 W9 H9" | | "FIGURE 1" |
| 04 | "IMAGE" | "X10 Y10 W10 H10" | | "FIGURE 2" |
| 05 | "IMAGE" | "X11 Y11 W11 H11" | | "FIGURE 3" |

| REGION NUMBER | ATTRIBUTE INFORMATION | RECTANGLE INFORMATION "X COORDINATE VALUE, Y COORDINATE VALUE, WIDTH, HEIGHT" | CHARACTER RECOGNITION INFORMATION |
|---|---|---|---|
| 01 | "HEADING" | "X1 Y1 W1 H1" | "TECHNICAL" |
| 02 | "BODY" | "X2 Y2 W2 H2" | "TESTTESTTEST..." |
| 03 | "GRAPH" | "X3 Y3 W3 H3" | |
| 04 | "IMAGE" | "X4 Y4 W4 H4" | |
| 05 | "IMAGE" | "X5 Y5 W5 H5" | |

702

| REGION NUMBER | ATTRIBUTE INFORMATION | RECTANGLE INFORMATION "X COORDINATE VALUE, Y COORDINATE VALUE, WIDTH, HEIGHT" | CHARACTER RECOGNITION INFORMATION |
|---|---|---|---|
| 01 | "HEADING" | "X1 Y1 W1 H1" | "TECHNICAL" |
| 02 | "BODY" | "X2 Y2 W2 H2" | "TESTTESTTEST..." |
| 03 | "GRAPH" | "X3 Y3 W3 H3" | |
| 04 | "IMAGE" | "X4 Y4 W4 H4" | |
| 05 | "GRAPHIC" | "X6 Y6 W6 H6" | |
| 06 | "IMAGE" | "X7 Y7 W7 H7" | |

FIG. 10

| REGION NUMBER | ATTRIBUTE INFORMATION | RECTANGLE INFORMATION "X COORDINATE VALUE, Y COORDINATE VALUE, WIDTH, HEIGHT" | CHARACTER RECOGNITION INFORMATION |
|---|---|---|---|
| 01 | "HEADING" | "X1 Y1 W1 H1" | "TECHNICAL" |
| 02 | "BODY" | "X2 Y2 W2 H2" | "TESTTESTTEST…" |
| 03 | "GRAPH" "FRAME" | "X3 Y3 W3 H3" | |
| 04 | "IMAGE" | "X4 Y4 W4 H4" | |
| 05 | "IMAGE" "FRAME" | "X5 Y5 W5 H5" | |

| REGION NUMBER | ATTRIBUTE INFORMATION | RECTANGLE INFORMATION "X COORDINATE VALUE, Y COORDINATE VALUE, WIDTH, HEIGHT" | CHARACTER RECOGNITION INFORMATION |
|---|---|---|---|
| 01 | "HEADING" | "X1 Y1 W1 H1" | "TECHNICAL" |
| 02 | "BODY" | "X2 Y2 W2 H2" | "TESTTESTTEST…" |
| 03 | "GRAPH" "GROUND" | "X3 Y3 W3 H3" | |
| 04 | "IMAGE" | "X4 Y4 W4 H4" | |
| 05 | "IMAGE" "GROUND" | "X5 Y5 W5 H5" | |

~1301

FIG. 18
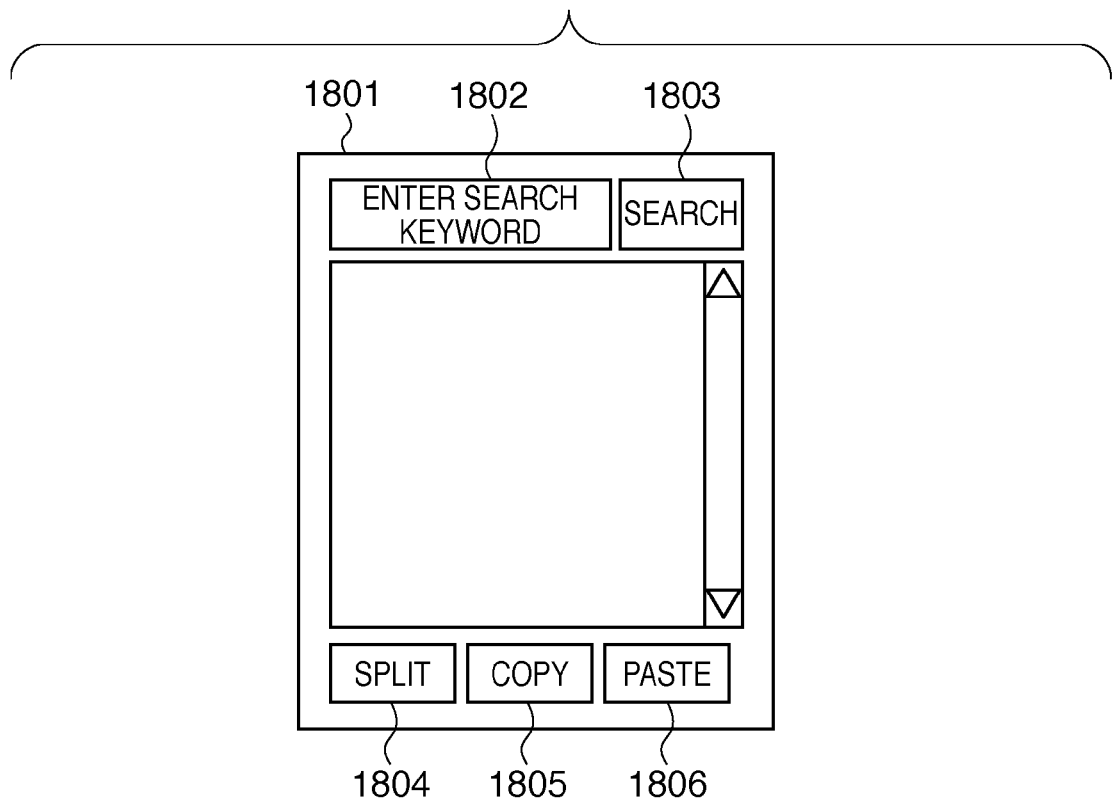
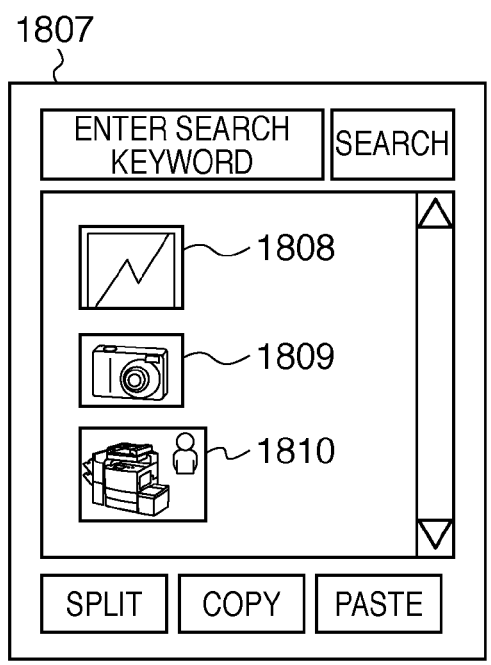
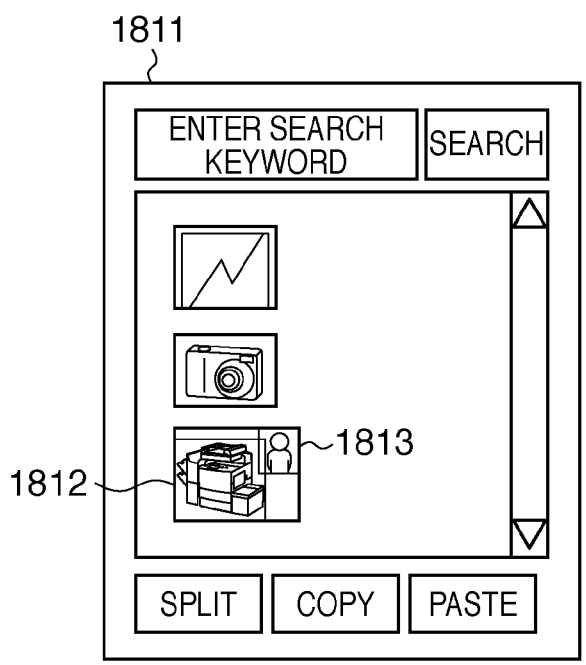

IMAGE PROCESSING APPARATUS THAT GROUPS OBJECT IMAGES BASED ON OBJECT ATTRIBUTE, AND METHOD FOR CONTROLLING THE SAME

BACKGROUND OF THE INVENTION

1. Field of the Invention

The present invention relates to image processing technology, and in particular, to technology with which an object included in image data is managed.

2. Description of the Related Art

In recent years, with environmental issues becoming more significant, a paperless system has been rapidly introduced in offices. As technology that realizes the paperless system, there is technology with which paper documents stored in a binder or the like are read using a scanner so that the read images are converted into electronic data and stored.

Japanese Patent Laid-Open No. 2001-358857 (Patent Document 1) proposes a document management system in which such electronic data is stored in a storage apparatus and managed, an image communication system in which data is transmitted to a distant place, and the like. Further, Japanese Patent Laid-Open No. 2004-326490 (Patent Document 2) proposes an image processing method for converting an input image into vector data in order to easily reuse information saved in the form of a paper document or image data. Specifically, Patent Document 2 discloses technology with which region splitting/dividing is performed on image data so that the data is split into a character region, a line drawing region (a table region and a graphic region), or a photographic image region and, thereafter, designation of a rectangular block on which vectorization is to be performed is received from a user. Moreover, Japanese Patent Laid-Open No. 2003-263642 (Patent Document 3) and Japanese Patent Laid-Open No. 2004-30430 (Patent Document 4) disclose technology with which region splitting is performed using a labeling method or the like so that region information on individual images is obtained.

However, for example, with the technology disclosed in Patent Document 2, a region including a plurality of images (objects) is often obtained as a result of region splitting. Therefore, region splitting information regarding the desired individual images cannot be obtained and, thus, the user has to perform an editorial operation again using a PC or the like, which is troublesome. That is, there has been a problem that the technology is unsuitable for the editing and reuse of individual images.

On the other hand, region information regarding individual images can be obtained through region splitting using the labeling method or the like. However, if all pieces of region information are saved at all times, the data amount will be enormous and, thus, this requires a large amount of storage space. In addition, when an image search is performed, there is a problem that processing time becomes significantly longer.

The present invention was achieved in view of the aforementioned problems, and an object thereof is to provide technology with which an object in image data can be managed in further appropriate units.

SUMMARY OF THE INVENTION

According to one aspect of the present invention, an image processing apparatus comprises: an input unit for inputting image data; a detection unit that detects object images included in the input image data; a determination unit that determines an object attribute for each of the detected object images; a storage control unit that groups the detected object images based on the respective determined object attributes, and stores region information regarding the detected object images, corresponding to the groups, in association with the image data in a storage unit; a dividing determination unit that determines whether or not to divide the grouped object images; and a dividing unit that, if dividing is determined to be performed by the dividing determination unit, extracts an individual object image from the grouped object images.

According to another aspect of the present invention, a method for controlling an image processing apparatus comprises: an input step of inputting image data; a detection step of detecting object images included in the input image data; a determination step of determining an object attribute for each of the detected object images; a storage control step of grouping the detected object images based on the respective determined object attributes, and storing region information regarding the detected object images, corresponding to the groups, in association with the image data in a storage unit; a dividing determination step of determining whether or not to divide the grouped object images; and a dividing step of, if dividing is determined to be performed, extracting an individual object image from the grouped object images.

The present invention can provide technology with which an object in image data can be managed in further appropriate units.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a flowchart showing operations performed in the image processing apparatus according to the first exemplary embodiment.

FIG. 4 is a diagram showing exemplary results obtained by extracting an object image from image data.

FIGS. 5A-5C are diagrams showing exemplary region information data formats when a caption accompanies image data.

FIG. 7 is a diagram showing exemplary region information data formats when a caption does not accompany image data.

FIG. 10 is a diagram showing an example of a region information data format when a frame object exists.

FIG. 13 is a diagram showing an example of a region information data format when a ground attribute exists.

FIG. 18 is a diagram showing examples of a user interface of image search software.

DESCRIPTION OF THE EMBODIMENTS

Hereinafter, preferred embodiments of the invention will be described in detail with reference to the drawings. It should be noted that the embodiments below are merely exemplary and are not intended to limit the scope of the present invention.

First Exemplary Embodiment

The first exemplary embodiment of an image processing apparatus according to the present invention will be described below, taking an MFP (Multi Function Peripheral) as an example.

Outline

Image data is read using a scanner, an object image included in the image data is detected, and region information concerning the detected object image is saved in a storage unit in association with the image data. In the first exemplary embodiment, grouping is performed in units of a detected object image and a corresponding object image having a caption attribute, and region information thereon is saved.

Apparatus Configuration

Figure 1:
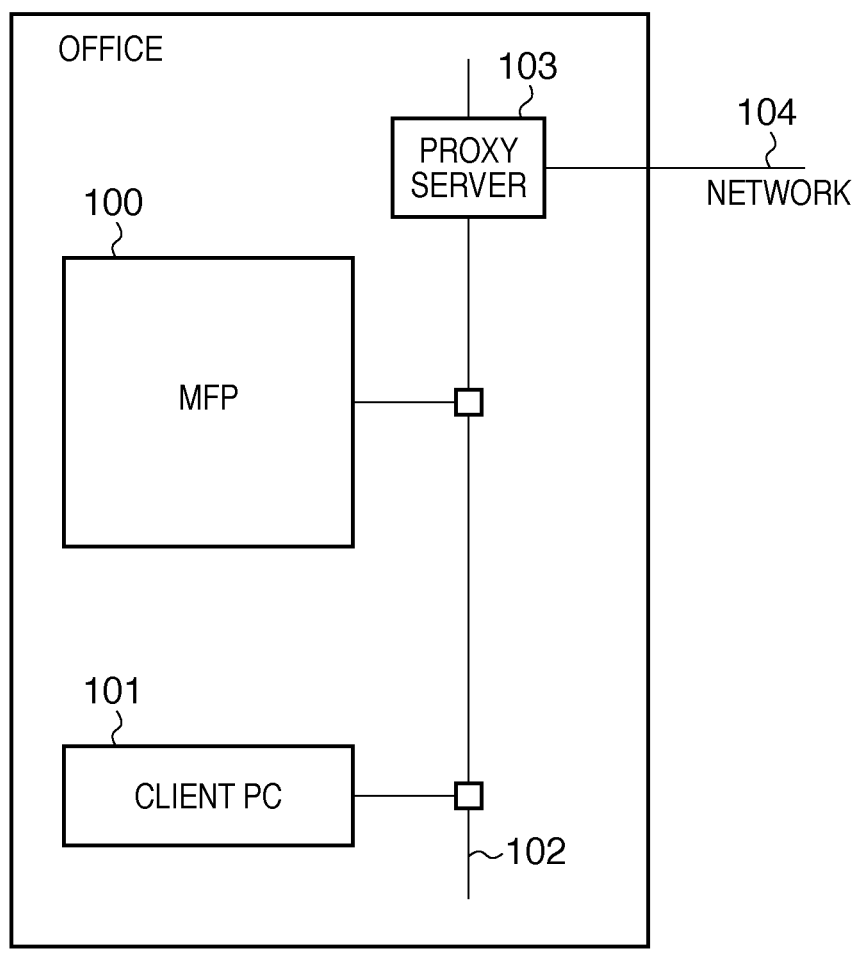
FIG. 1 is a block diagram showing the overall configuration of an image processing system including an image processing apparatus according to a first exemplary embodiment.

FIG. 1 is a block diagram showing an overall configuration of an image processing system including an image processing apparatus according to the first exemplary embodiment.

An MFP (multi function peripheral) 100, a client PC 101, which uses the MFP 100, and a proxy server 103 are connected to a LAN 102 installed in an office.

The MFP 100 has a plurality of functions, such as a copying function, a printing function, and a transmission function (file transmission, facsimile transmission). The LAN 102 is connected to an external network 104 via the proxy server 103. The network 104 is typically a communication network such as the Internet, a telephone line, a dedicated digital line, an ATM or frame relay line, a satellite line, a cable television line, or a wireless line; however, any network capable of transmitting/receiving data can be applied. For example, by transmitting printing data to the MFP 100, the client PC 101 causes the MFP 100 to print out a printing based on the printing data.

Note that the client PC 101 and the proxy server 103 respectively include standard constituent elements (e.g., a CPU, a RAM, a ROM, an external storage apparatus, and the like) with which a general-purpose computer (PC) is equipped. In addition, the client PC 101 and the proxy server 103 include a network interface for connecting to the network 104, a display as a user interface, a keyboard, a mouse, and the like.

Figure 2:
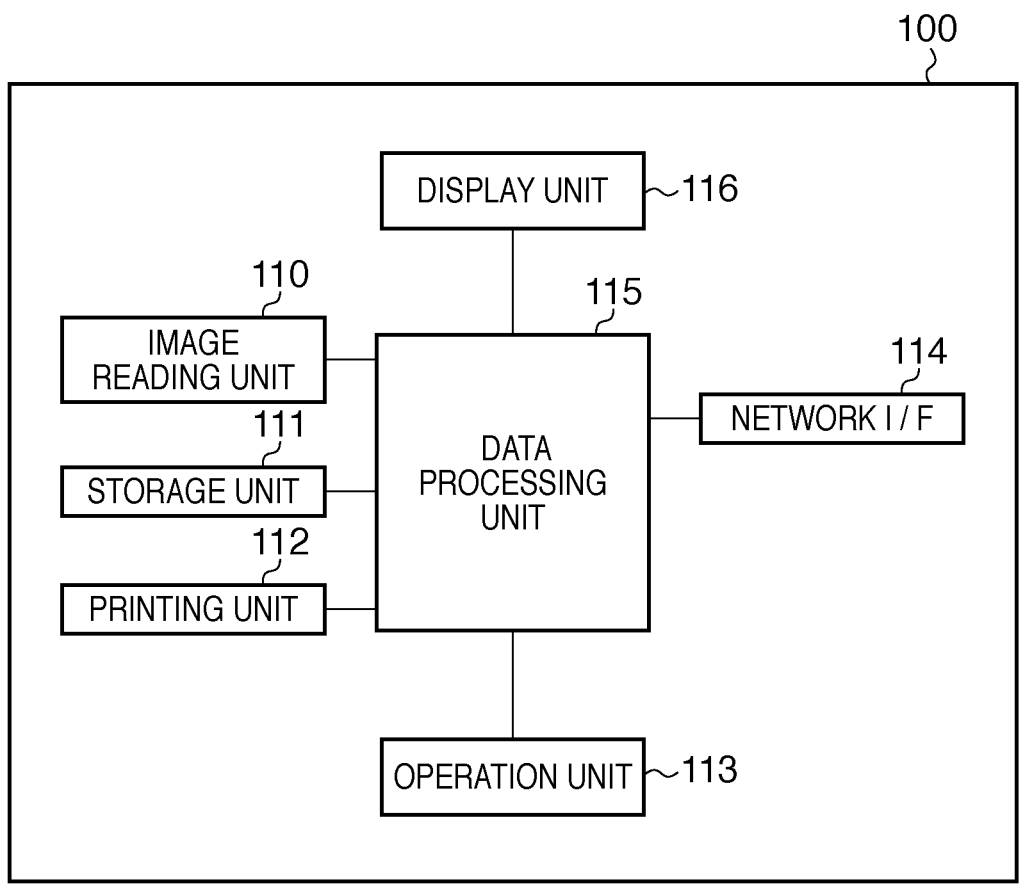
FIG. 2 is a diagram showing the internal configuration of the image processing apparatus according to the first exemplary embodiment.

FIG. 2 is a diagram showing the internal configuration of the MFP 100 according to the first exemplary embodiment.

An image reading unit 110 irradiates one or more originals using a light source (not shown), and an original reflection image is formed upon a solid-state image sensor using a lens. Further, the image reading unit 110 is a functional unit that obtains, from the solid-state image sensor, an image reading signal in raster form as image information (a raster image) with a predetermined resolution (e.g., 600 dpi). The image reading unit 110 may include an automatic document feeder (ADF) that automatically conveys an original.

A storage unit 111 is constituted from, for example, a high-capacity hard disk and stores image data read by the image reading unit 110 and image data transmitted from the client PC 101. The storage unit 111 is also configured as a database and manages stored image data. Here, it is assumed that the image data read by the image reading unit 110 and region information obtained by performing region splitting on the image data are managed in association with each other.

An operation unit 113 and a display unit 116 function as a user interface and receive various operations from a user and provide the user with information. The operation unit 113 is constituted from a key operation unit, a touch panel, and the like, and the display unit 116 is constituted from, for example, a liquid crystal display.

A data processing unit 115 is a functional unit that processes data based on an instruction from the user via the operation unit 113 or an instruction via a network.

A printing unit 112 is a functional unit that outputs (prints) data processed by the data processing unit 115 onto a recording medium such as a sheet. In addition to an electrophotographic method, an ink-jet method and the like are applied as a recording method.

As described above, the MFP 100 has a copying function of printing an image corresponding to an image reading signal onto a recording medium using the printing unit 112. In the case of copying one original image, image processing is performed on an image reading signal output from the image reading unit 110 using the data processing unit 115 so that a recording signal is generated. Thereafter, based on the generated recording signal, the printing unit 112 prints the image onto a recording medium. On the other hand, in the case of making a plurality of copies of an original image, one-page's worth of a recording signal is once stored in the storage unit 111. After that, the recording signal is sequentially output to the printing unit 112, and the image is printed onto recording media.

Furthermore, the MFP 100 has a transmission function of transmitting image data corresponding to an image reading signal to an external apparatus via the network. For example, a raster (bitmap) image file such as TIFF, JPEG, and the like, or a vector image file such as PDF is generated based on an image reading signal obtained from the image reading unit 110, with the transmission function, an image file. Then, the generated image file is transmitted to the external apparatus via a network I/F 114. That is, transmission is performed to the client PC 101 via the LAN 102 or to an apparatus (e.g., another MFP or client PC) on an external network via the network 104.

Moreover, the MFP 100 has a printing function of receiving printing data from the external apparatus and outputting (printing) an image onto a printing medium such as a sheet. For example, printing data is received from the client PC 101 via the network I/F 114, image processing is performed thereon by the data processing unit 115, and a recording signal is generated. Thereafter, based on the generated recording signal, the printing unit 112 prints an image onto a recording medium.

Apparatus Operation

FIG. 3 is a flowchart showing operations performed in the image processing apparatus according to the first exemplary embodiment.

In step S301, the MFP 100 reads an original image and generates image data. Specifically, the image reading unit 110 is caused to operate, to scan one original, and to obtain an image reading signal at a preset resolution and density level. Thereafter, the data processing unit 115 pre-processes the image reading signal, and the storage unit 111 stores the signal as image data corresponding to one-page worth of an input image.

In step S302, a region containing an object image included in image data stored in the storage unit 111 is extracted. An example of a method for extracting an object image region is described below.

First, the image data is split into M×N regions, and if even one significant pixel exists in each region, a thinned image is created assuming that there is an image. Then, a rectangular region is created by putting together portions where the thinned images are connected. For example, if rectangular regions have a high aspect ratio, and short sides thereof are adjacent to each other, the possibility of such regions being a character string is high and, thus, such rectangular regions are connected in this case. If a group of rectangular regions have short sides whose lengths are almost the same and are arranged at substantially regular intervals, the possibility of such a group of rectangular regions being a body portion is high and, thus, the rectangular regions in the group are connected.

FIG. 4 is a diagram showing exemplary results obtained by extracting an object image from image data. As shown in examples in 400a to 400c, in region extracting processing, due to preset precision, complexity of a layout of input image data, or the like, there may be more than one result. In 400a, eight regions from regions 401 to 408 are extracted. On the other hand, the regions 403 to 408 shown in 400a are extracted as three regions that are regions 409 to 411 in 400b. Alternatively, the regions 403 to 408 shown in reference numeral 400a are extracted as a single region that is a region 412 in 400c. However, description below will be given assuming that regions are extracted as shown in 400a.

In step S303, an attribute (object attribute) of an object image is determined for each region extracted in step S302, and attribute information is added to the region. Here, an attribute is selected as an image feature of an object image from "heading", "body", "graph", "image", and "caption" as described below. Note that information on rectangular region formation in step S302 may be used for attribute determination. Alternatively, determination may be performed based on a feature of an image (pixel) within the formed rectangular region.

For example, the region 402 is a region generated by connecting a plurality of small rectangular regions in step S302. In this case, the possibility of being a body portion is determined to be high, and "body" attribute information is added.

First, whether or not a remaining region includes a character is determined. For example, if an image appears periodically in a region, the region is determined to include a character. Based on the presence or absence of the image, whether or not a region includes a character can be determined. As a result, the regions 401, 404, 406, and 408 are determined to be regions including a character. That is, the region is determined to correspond to any of the "heading", "body", or "caption". If a character region is wider than a row of characters in a body portion and is in a position different from a body portion column, the attribute is determined to be a "heading". Here, the region 401 is set as the "heading".

On the other hand, for regions other than the above region, the "graph" attribute is added to a region with a small pixel density, and the "image" attribute is added to a region other than that region, considering the region to be a picture or a photograph. Note that if the size of a region is small, region information may be deleted, considering the region to be noise.

The "caption" attribute is added to a character region that is adjacent to the top or bottom of a region to which the "graph" or "image" attribute has been added (here, the regions 403, 405, and 407). That is, the regions 404, 406, and 408 are set to have the "caption" attribute.

Note that in this case, a region set as the "caption" is stored in association with a region corresponding to the "caption" (i.e., a region to which the "graph" or "image" attribute has been added).

As described above, an attribute is set for each region in 400a. That is, the "heading" attribute is added to the region 401, the "caption" attribute is added the regions 404, 406, and 408, the "graph" attribute is added to the region 403, and the "image" attribute is added to the regions 405 and 407, respectively.

In step S304, character recognition is performed on a region to which the "body", "heading", or "caption" attribute has been added, that is, a region determined to include a character string. Then, the result is associated with an input image as character information. Note that if character recognition fails, attribute determination in step S303 is determined to be incorrect, and the attribute may be changed to, for example, the "image" attribute or the like.

In step S305, for a region to which the "image" or "graph" attribute has been added, determination whether or not a "caption" region accompanies the region is performed. If such a region exists, processing proceeds to step S308, and region information regarding an object image obtained through the aforementioned processing is saved in association with image data in the storage unit 111. This corresponds to an operation performed by a storage control unit in the claims. Note that determination of whether or not a region to which the "caption" attribute has been added accompanies a region may be performed on each region to which the "image" or "graph" attribute has been added, or may be performed in units of image data (units of a page).

FIGS. 5A-5C are diagrams showing exemplary region information data formats when a caption accompanies image data.

First, a data format 501 will be described. "Region numbers" 01 to 08 in the data format 501 respectively correspond to the regions 401 to 408 shown in 400a. Attribute information indicates the aforementioned attribute such as "body", "heading", "caption", "image", and "graph".

Rectangular region information can be indicated by, for example, an X coordinate value and a Y coordinate value of a reference point in the region, and a width and a height. Of course, the rectangular region information may be designated by coordinate values of four apexes. The character recognition result performed in step S304 is included in character recognition information.

A record for an object image having the "caption" attribute is disposed directly after a record including an "image" or "graph" object image related to the caption. That is, an object image having the "caption" attribute is grouped together with a corresponding object image, and stored in the region information.

In addition to the data format 501, an arbitrary data format can be applied, as long as the format enables determining whether or not an "image" or "graph" record is associated with the "caption" attribute record.

For example, as shown in a data format 502, additional information may be given to image regions (region numbers 03, 05, and 07) that are accompanied with image regions having the "caption" attribute (region numbers 04, 06, and 08) so that association may be indicated. Also, as shown in a data format 503, the "caption" attribute record may be assigned as additional information to a corresponding "image" or "graph" record. In this case, the "caption" attribute records themselves (region numbers 04, 06, and 08 shown in the data format 502) may be determined to be unnecessary, and deleted.

Moreover, as shown in a data format 504, a rectangular region having the "caption" attribute and a related "image" or "graph" rectangular region may be connected and saved as one rectangular region. For example, rectangular region information may be generated indicating a region to which the "image" or "graph" attribute has been added being connected to a region having the "caption" attribute related to that region. This case is the same as the case in which an object image is detected as shown in reference numeral 400b.

That is, in any data format described above, a unit of an image (grouped image data) is set so that a rectangular region determined to be an "image" or "graph" corresponds to a rectangular region having the "caption" attribute on a one to one basis.

On the other hand, the case in which the caption attribute does not accompany a region, that is, the case in which image data does not include a caption will be described below. That is, the case in which the determination result of step S305 is "NO" will be described with reference to FIGS. 6 and 7.

Figure 6:
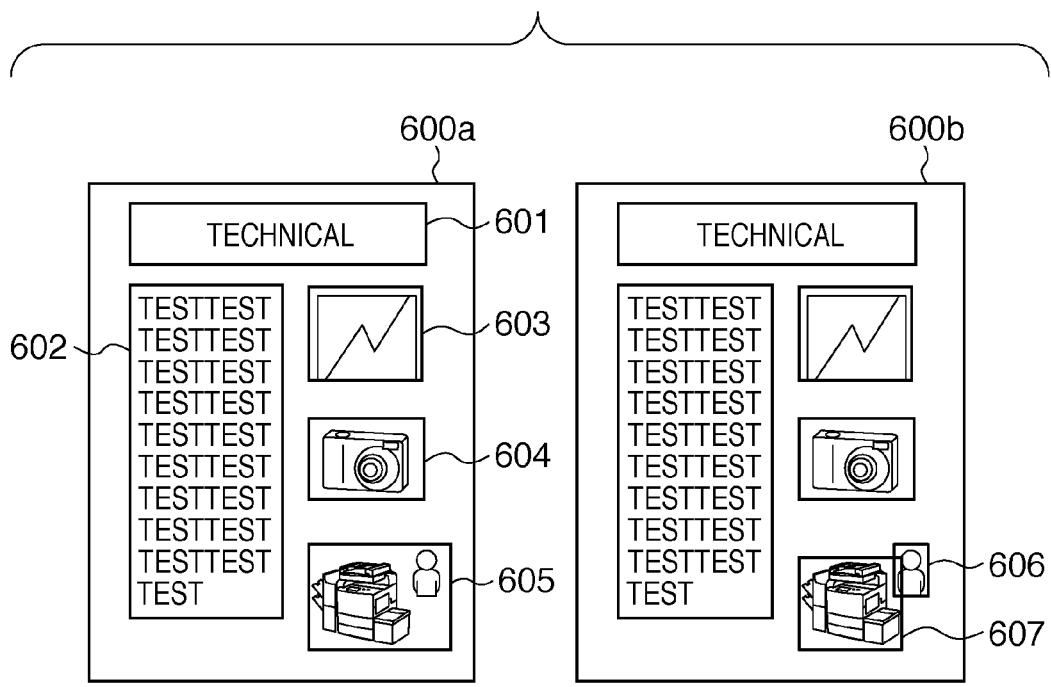
FIG. 6 is a diagram showing exemplary results obtained by extracting an object image from image data that is not accompanied with a caption.

FIG. 6 is a diagram showing exemplary results obtained by extracting an object image from image data that is not accompanied with a caption. Note that description below will be given assuming that an object image was extracted in step S302 as shown in 600a.

In step S306, region re-extraction is performed on a region to which the "image" or "graph" attribute has been added through processing such as labeling processing or projection clipping processing, which was not performed in step S302. That is, more detailed object image detection is performed compared to step S302. Here, technology that is generally known is applied as the labeling processing or projection clipping processing. As a result of region re-extraction, regions 606 and 607 shown in 600b are extracted from a region 605 shown in 600a.

In step S307, attribute information is added to a region that was re-extracted in step S306. An attribute that was added in step S303 may be applied as-is, or an attribute may be added by performing attribute determination again.

For example, as for a region that had the "image" attribute before region re-extraction in step S306, if the image is constituted from a single color, another attribute, for example, the "graphic" attribute or the like may be added again. As a result, the "image" attribute is added to the region 606, and the "graphic" attribute is added to the region 607. On the other hand, even if the labeling processing or the projection clipping processing is performed on regions 603 and 604, it is determined that there is only one object image within the each region and, thus, the result will not be changed even when the region re-extraction is performed.

FIG. 7 is a diagram showing exemplary region information data formats when a caption does not accompany image data.

Since an object image having the "caption" attribute does not exist, as shown in a data format 701 or 702, a record for each object image that has been recognized is separately recorded. Note that a region to which the "graph" attribute has been added may be stored in association with data represented in a predetermined form (numerical formula or the like) capable of reproducing a graph.

Image Processing Apparatus Operation in the Case of Reuse

Hereinafter, an operation of image search software that operates in the aforementioned MFP 100 will be described. However, the image search software may operate in the client PC 101 or the like, which is outside the MFP 100.

Figure 17:
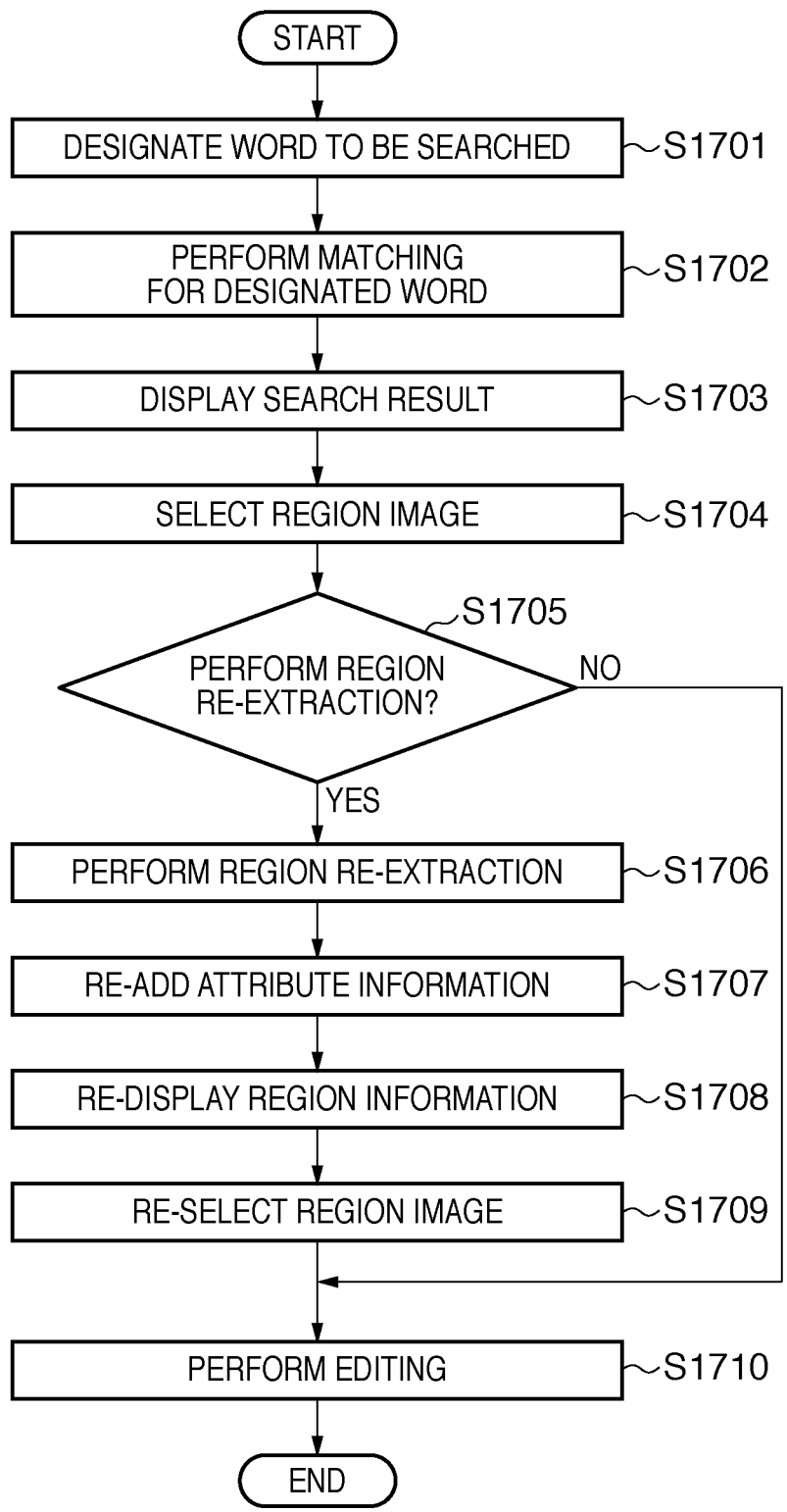
FIG. 17 is a flowchart showing image search processing when image data is reused.

FIG. 17 is a flowchart showing image search processing when image data is reused. FIG. 18 is a diagram showing examples of a user interface of the image search software.

Reference numeral 1802 denotes an input field for designating a search keyword. Reference numeral 1803 denotes a button to be pressed after the search keyword has been designated. Reference numeral 1804 denotes a button to be pressed when re-extraction (re-splitting/re-dividing) is performed after a region has been selected from a search result list. Reference numeral 1805 denotes a button to be pressed, after a region has been selected from the search result list, for copying an image in the region to a temporary storage region in the case of using the image in another document (not shown). Reference numeral 1806 denotes a button to be pressed when the image copied by pressing the button 1805 is pasted in another document (not shown).

In step S1701, a word used as a search condition is designated. For example, input from an operator, for example, via a keyboard may be received in the keyword input region 1802. Here, for example, a keyword, "figure", is designated.

In step S1702, information in the region information is searched based on the keyword designated in step S1701. For example, as for region information in the data format 502, a character string included in items of the additional information is searched.

In step S1703, an object image having the additional information corresponding to region information that was successfully matched due to the search is displayed in a list. Here, the keyword, "figure", successfully matches the region numbers 03, 05, and 07 in the data format 502 shown in FIG. 5, and these object images are displayed on the user interface as a search result list. Reference numeral 1807 shows when these images are displayed. Here, reference numeral 1808 corresponds to the region number 03, reference numeral 1809 corresponds to the region number 05, and reference numeral 1810 corresponds to the region number 07. Reference numeral 1808 denotes a graph, reference numeral 1809 denotes a camera image, and reference numeral 1810 denotes an object image including a printing apparatus and a person.

In step S1704, selection of a region image that the user desires to use from the search result list is received.

In step S1705, it is determined whether or not the selected region image needs to be re-split (dividing determination unit). Specifically, determination is performed based on whether or not the user presses a "splitting" button shown in FIG. 18. If re-splitting is determined to be performed, processing proceeds to step S1706 in which region re-extraction is performed and to step S1707 in which attribute information re-addition is performed. If re-splitting is determined not to be performed, processing proceeds to step S1710, and editing such as pasting of the selected region image in another document is performed.

For example, if the user desires to reuse only an image of the printing apparatus included in the object image 1810, after selecting the object image 1810, the user presses the splitting button 1804. Note that re-splitting may be performed using a similar method to that used in the aforementioned steps S306 and S307.

In step S1708, region information after region re-extraction has been performed is displayed. Reference numeral 1811 denotes an exemplary display of the user interface after a splitting instruction has been issued. Here, reference numerals 1812 and 1813 denote region images as a result of region re-extraction. Reference numeral 1812 denotes an object image including only an image of the printing apparatus, and on the other hand, reference numeral 1813 denotes an object image including only an image of a person.

In step S1709, as a result of the region re-extraction, based on the region information that is displayed, a user selection of the object image to be used is received. For example, if only an MFP image included in the object image 1810 is to be reused, the object image 1812 is selected.

In step S1710, when the selected region image is to be pasted in another document, a "copy" button on the user interface is pressed, and after designating another document (not shown), editing is performed by pressing a "paste" button.

In this manner, region information on an object image corresponding to image data is stored in such a data format as described above and, thus, images can be managed in appropriate units that are easier for the user to use.

For example, when the user saves image data of an input original in the storage apparatus for the main purpose of reuse, region information is saved in units of the aforementioned group and, thus, the number of data pieces (the number of files) or data capacity (file capacity) is reduced. Accordingly, the burden on the storage apparatus can be reduced. Also, when region information saved in the storage apparatus is searched, the search speed can be increased by referring to the aforementioned region information. Additionally, images can be easily used in units of a group saved in the storage apparatus or in units of each image saved in the storage apparatus.

Second Exemplary Embodiment

Outline

In the second exemplary embodiment, among detected object images, images are grouped in units of objects surrounded by the same (shared) "frame" object, and region information thereon is saved. Note that the apparatus configuration is the same as that in the first exemplary embodiment and, thus, description thereof will be omitted.

Apparatus Operation

Figure 8:
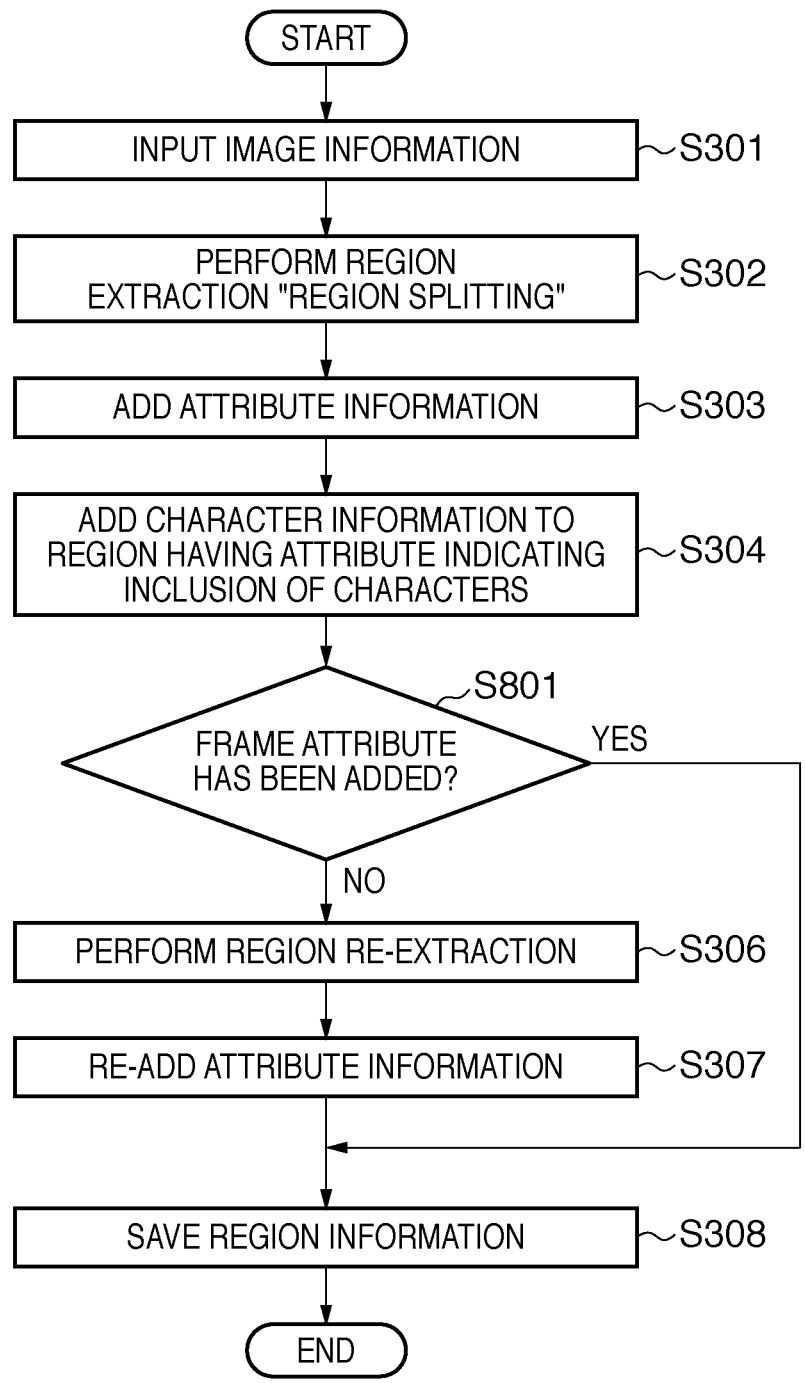
FIG. 8 is a flowchart showing operations performed in an image processing apparatus according to a second exemplary embodiment.

FIG. 8 is an operation flowchart performed in an image processing apparatus according to the second exemplary embodiment. The only main difference from the first exemplary embodiment is that an object image having a "frame" attribute is detected in steps S303 and S304, and step S305 is replaced with step S801.

Figure 9:
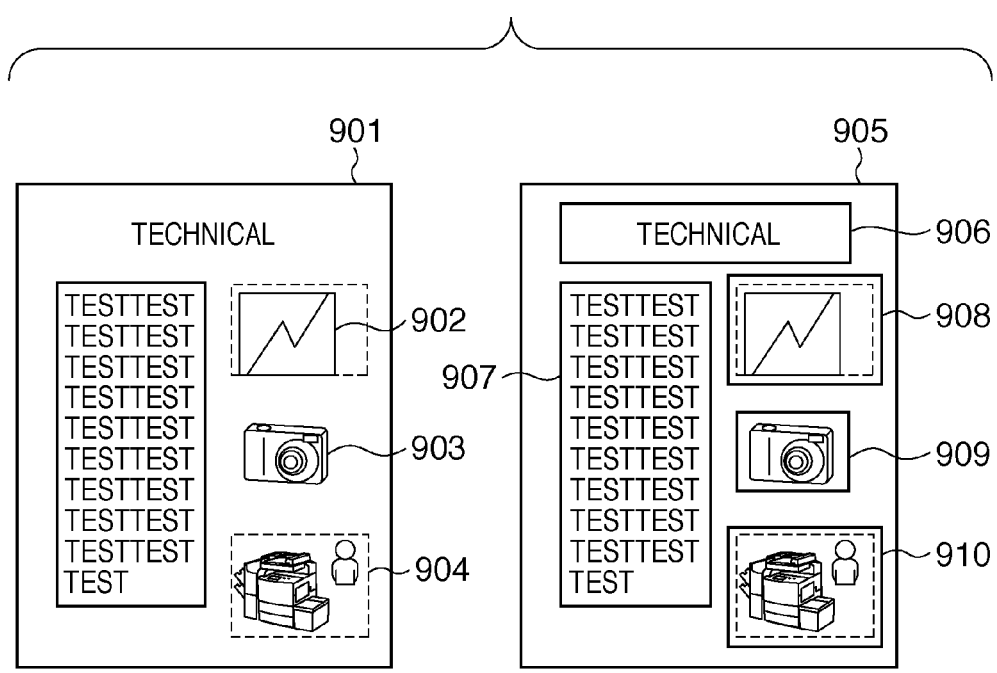
FIG. 9 is a diagram showing examples of extraction of an object image from image data.

FIG. 9 is a diagram showing an example of extracting an object image from image data. Reference numeral 901 denotes image data to be input, and reference numerals 902 and 904 denote images surrounded by a frame. Also, reference numeral 903 denotes an image that is not surrounded by a frame. On the other hand, reference numeral 905 denotes a result of region splitting when an original shown in reference numeral 901 is input, the "heading" attribute is added to a region 906, the "body" attribute is added to a region 907, the "graph" attribute is added to a region 908, and the "image" attribute is added to regions 909 and 910. Moreover, the "frame" attribute is also added to the regions 908 and 910.

FIG. 10 is a diagram showing an example of a region information data format when a framed object exists. Information regarding the regions 906 to 910 is saved in a data format denoted by reference numeral 1001. That is, a plurality of framed images such as in the region 904 is included in region information as one object image.

In step S801, determination of whether or not an object image having the "frame" attribute exists in a region to which the "image" or "graph" attribute has been added is performed. If the "frame" attribute has been added, region information regarding image data obtained through the aforementioned processing is saved with the input image in the storage unit 111 in step S308. If the frame attribute is not added, region re-extraction is performed in step S306.

As described above, in the image processing apparatus according to the second exemplary embodiment, region information is saved in units of images surrounded by the same frame object. Accordingly, similar effects to those described in the first exemplary embodiment can be obtained.

Third Exemplary Embodiment

Outline

In the third exemplary embodiment, among the detected object images, images are grouped in units of objects having the same (shared) "ground" image (solid fill, halftone, gradation, etc.), and region information thereon is saved. Note that the apparatus configuration is the same as that in the first exemplary embodiment and, thus, description thereof will be omitted.

Apparatus Operation

Figure 11:
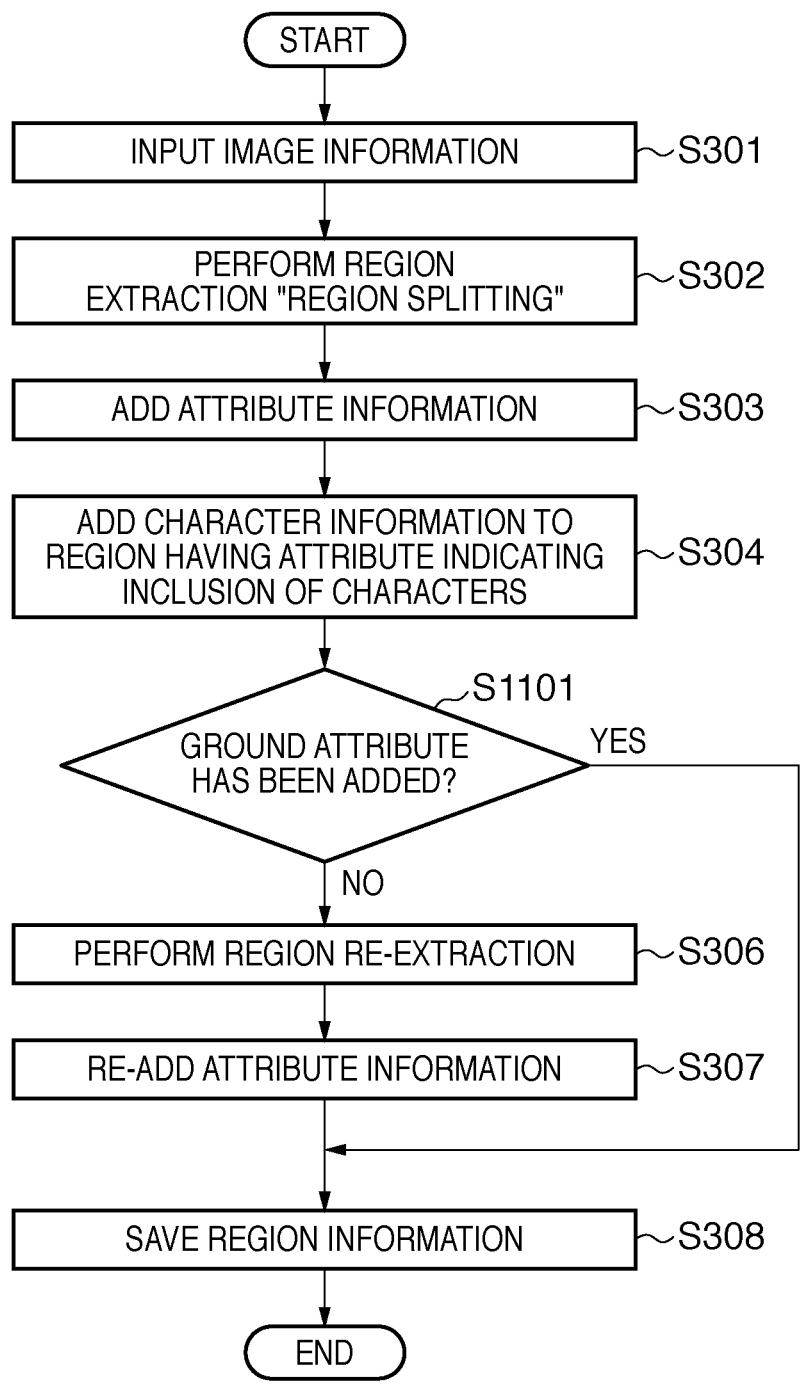
FIG. 11 is a flowchart showing operations performed in an image processing apparatus according to a third exemplary embodiment.

FIG. 11 is a flowchart showing operations performed in an image processing apparatus according to the third exemplary embodiment. The only main difference from the first exemplary embodiment is that an object image having a "ground" attribute is detected in steps S303 and S304, and step S305 is replaced with step S1101.

Figure 12:
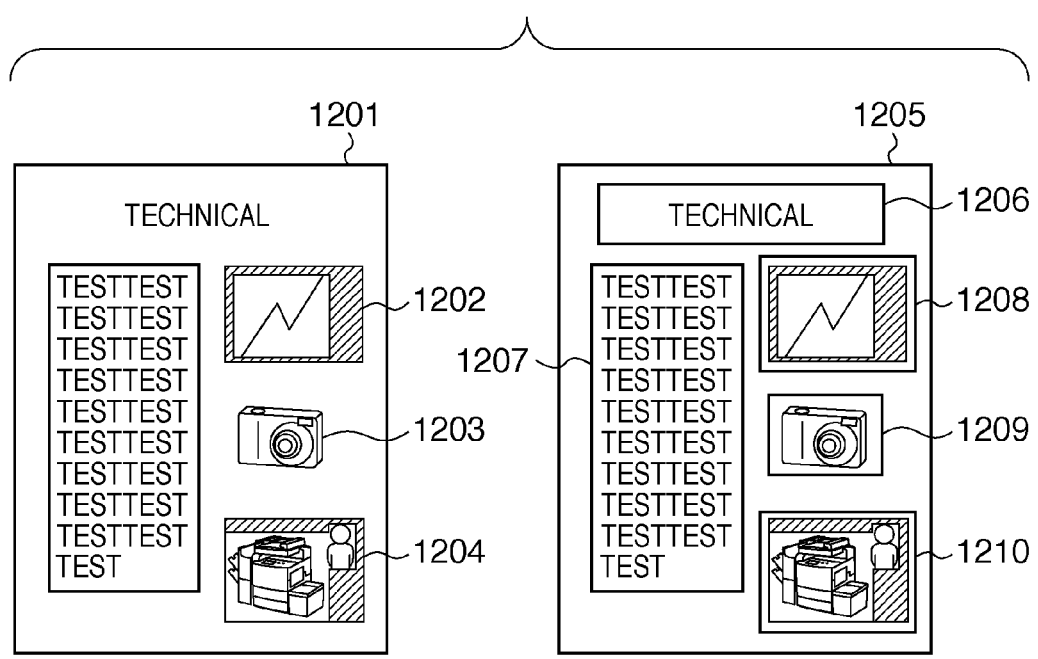
FIG. 12 is a diagram showing examples of extraction of an object image from image data.

FIG. 12 is a diagram showing examples of extracting an object image from image data. Reference numeral 1201 denotes image data to be input, and reference numerals 1202 and 1204 denote images having ground images different from the overall ground of the image data (e.g., white solid fill). Reference numeral 1203 denotes an image having the same ground as the entire ground of the input original. On the other hand, reference numeral 1205 denotes a result of region splitting performed on the image data 1201, the "heading" attribute is added to a region 1206, the "body" attribute is added to a region 1207, the "graph" attribute is added to a region 1208, and the "image" attribute is added to regions 1209 and 1210. Moreover, the "ground" attribute is also added to the regions 1208 and 1210.

FIG. 13 is a diagram showing an example of a region information data format when the ground attribute exists. Information regarding the regions 1206 to 1210 is saved in a data format denoted by reference numeral 1301. That is, a plurality of images surrounded by a frame such as in the region 1204 is included in region information as one object image, being associated with each other.

In step S1101, determination of whether or not an object image having the "ground" attribute exists in a region to which the "image" or "graph" attribute has been added is performed. If the "ground" attribute has been added, region information regarding image data obtained through the aforementioned processing is saved with an input image in the storage unit 111 in step S308. If the ground attribute is not added, region re-extraction is performed in step S306.

As described above, in the image processing apparatus according to the third exemplary embodiment, region information is saved in units of images having the same ground attribute. Accordingly, similar effects to those described in the first exemplary embodiment can be obtained.

Fourth Exemplary Embodiment

In the fourth exemplary embodiment, a configuration in which three types of modes below are switched based on a selection instruction from a user will be described.

(A) A mode in which a group is detected (hereinafter, referred to as an adaptive region splitting mode)

(B) A mode in which region re-extraction is always performed without detecting a group (hereinafter, referred to as a detailed region splitting mode)

(C) A mode in which detection in units of a predetermined group is not performed, and region re-extraction is not performed either (hereinafter, referred to as a simple region splitting mode)

Apparatus Operation

Figure 14:
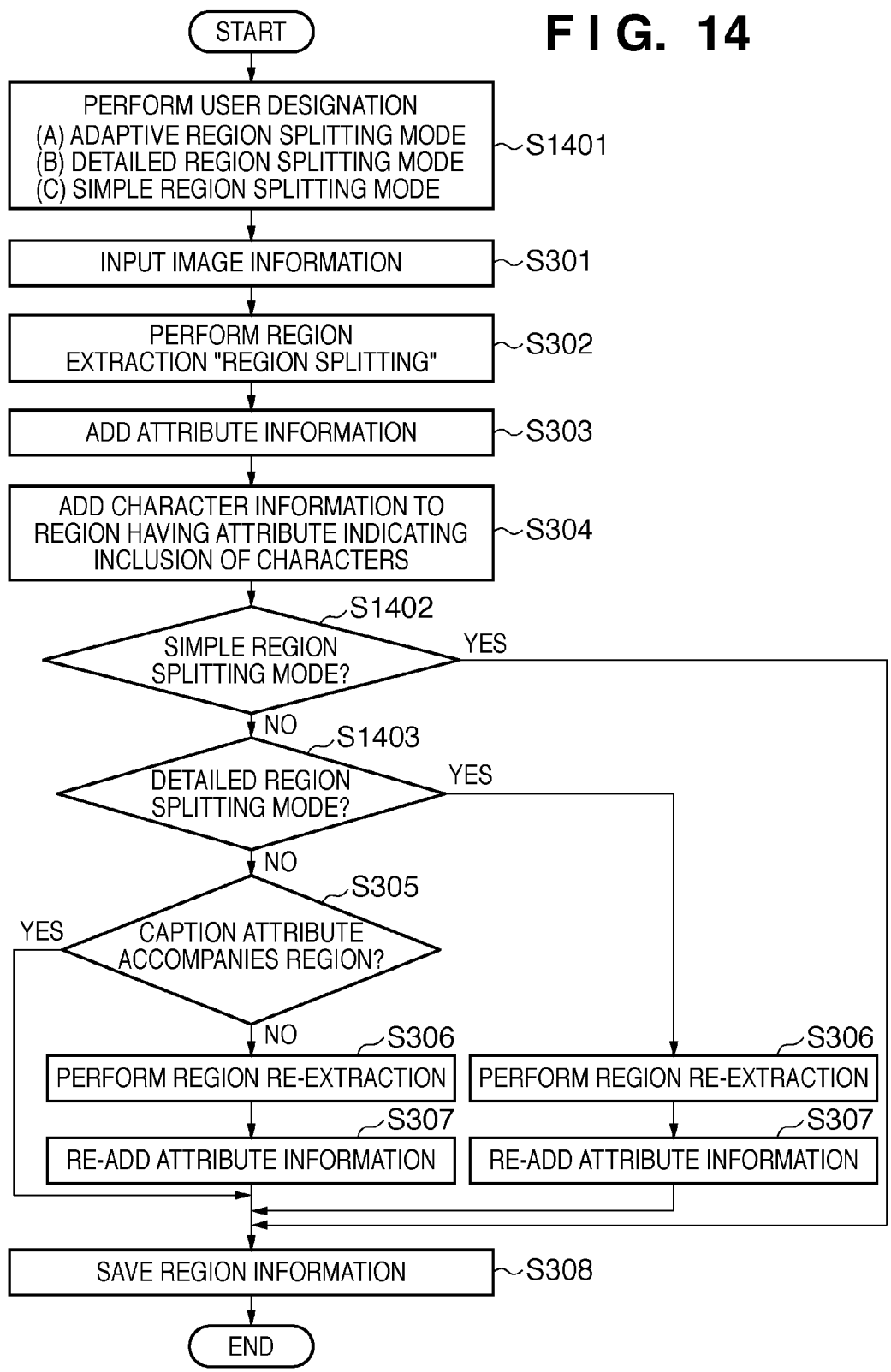
FIG. 14 is a flowchart showing operations performed in an image processing apparatus according to a fourth exemplary embodiment.

FIG. 14 is a flowchart showing operations performed in an image processing apparatus according to the fourth exemplary embodiment. The difference from the first exemplary embodiment is that steps S1401 to S1403 have been added.

In step S1401, selection of a mode from any of (A) the adaptive region splitting mode, (B) the detailed region splitting mode, and (C) the simple region splitting mode is performed via an operation screen of the operation unit 113 of the MFP 100, and the selection is received.

If the user designates "(A) the adaptive region splitting mode", the determination result of both steps S1402 and S1403 is No, and a similar operation to that in the first exemplary embodiment is performed as a result.

On the other hand, if the user designates "(B) the detailed region splitting mode", the determination result of step S1403 is Yes, and region re-extraction (S306) is performed regardless of whether or not a caption accompanies a region. That is, region information is stored in units of an image.

In contrast, if the user designates "(C) the simple region splitting mode", the determination result of step S1402 is Yes, and region re-extraction is not performed regardless of whether or not a caption accompanies a region. That is, the splitting result in step S302 is reflected as-is in the region information.

With the above configuration, the accuracy of extracting an object image included in image data can be set more in accordance with the user's intention. Note that in this case, the determination criterion in step S305 is "whether the caption attribute accompanies a region"; however, a determination criterion such as "whether the frame attribute accompanies a region" or "whether the ground attribute accompanies a region" as described in the second and third exemplary embodiments may be applied.

Fifth Exemplary Embodiment

In the fifth exemplary embodiment, a method for performing region splitting is controlled based on an input of a purpose of using an object image from the user. Here, a configuration in which methods for performing region splitting are switched in accordance with two types of purposes of use below will be described.

(a) Save image data in a storage region (hereinafter, referred to as a save mode)

(b) Transmit an image via a network or perform normal copy (hereinafter, referred to as a transmission/copy mode)

Apparatus Operation

Figure 15:
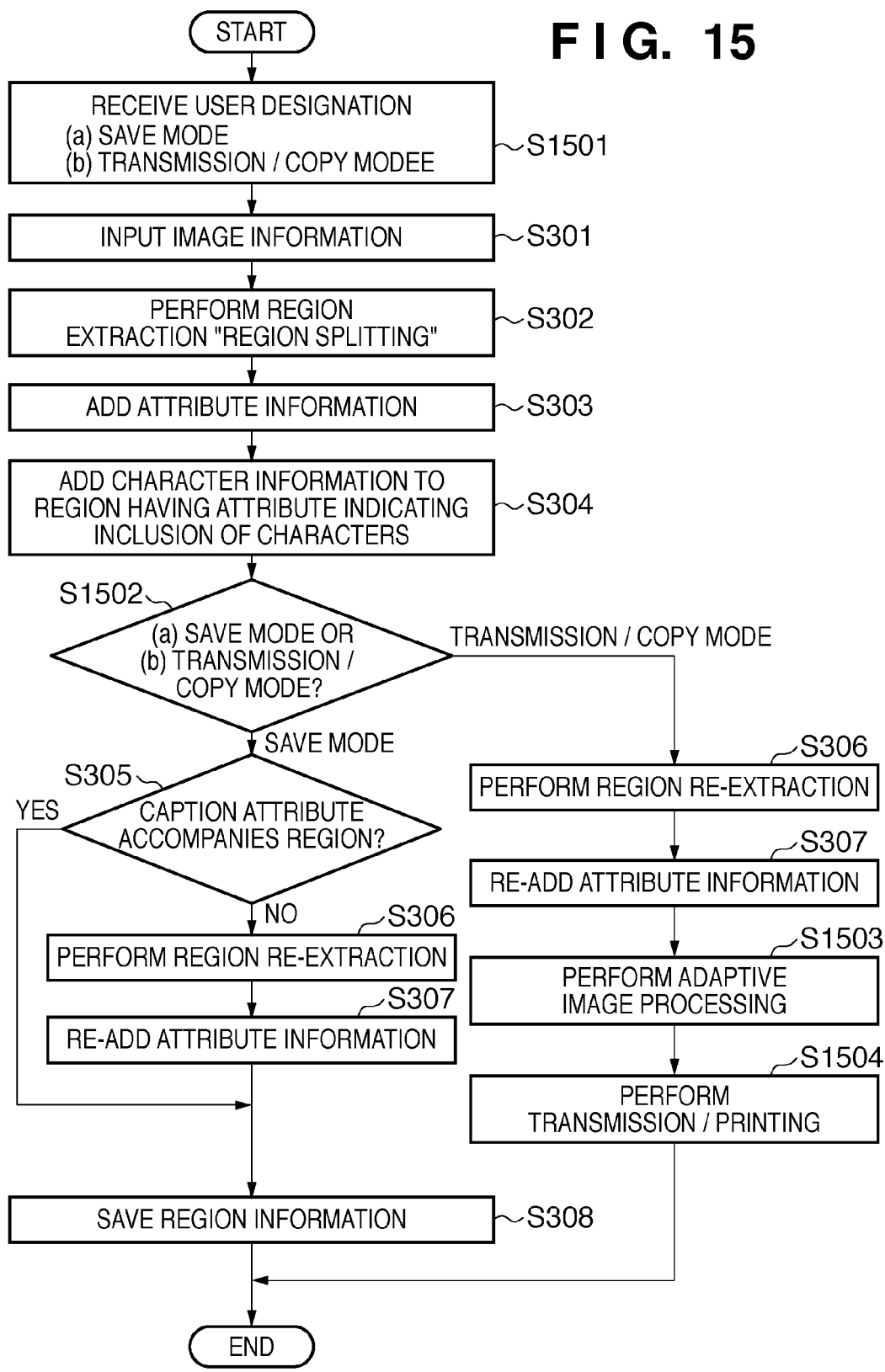
FIG. 15 is a flowchart showing operations performed in an image processing apparatus according to a fifth exemplary embodiment.

FIG. 15 is a flowchart showing operations performed in an image processing apparatus according to the fifth exemplary embodiment. The difference from the first exemplary embodiment is that steps S1501 to S1504 have been added.

In step S1501, an input of a user selection of (a) the save mode or (b) the transmission/copy mode via an operation screen of the operation unit 113 of the MFP 100 is received.

If the user designates "(a) the save mode", a similar operation to that in the first exemplary embodiment is performed as a result. On the other hand, if the user designates "(b) the transmission/copy mode", region re-extraction is always performed in step S306 and re-addition of attribute information is always performed in step S307, regardless of whether or not a caption accompanies a region.

In step S1503, adaptive image processing is performed. Here, the adaptive image processing is performing image processing in accordance with a region attribute and, thus, image quality can be improved. For example, JPEG compression is performed on an image having the "image" attribute, outlining (vectorization) or ZIP compression is performed on an image having the "graphic" attribute. Also, when copy processing is performed, color processing and image forming processing are switched.

With the above configuration, the accuracy of extracting an object image included in image data can be set more in accordance with the purpose of use. Note that in this case, the determination criterion in step S305 is "whether the caption attribute accompanies a region"; however, a determination criterion such as "whether the frame attribute accompanies a region" or "whether the ground attribute accompanies a region" as described in the second and third exemplary embodiments may be applied.

Modified Example

In the aforementioned first to third exemplary embodiments, the "caption" attribute, the "frame" attribute, and the "ground" attribute are used as a unit when grouping is performed. However, an attribute that can be used for grouping is not limited to these, and, for example, an attribute indicating a feature quantity of an image (object) within a region having the "image" or "graph" attribute may also be used.

Figure 16:
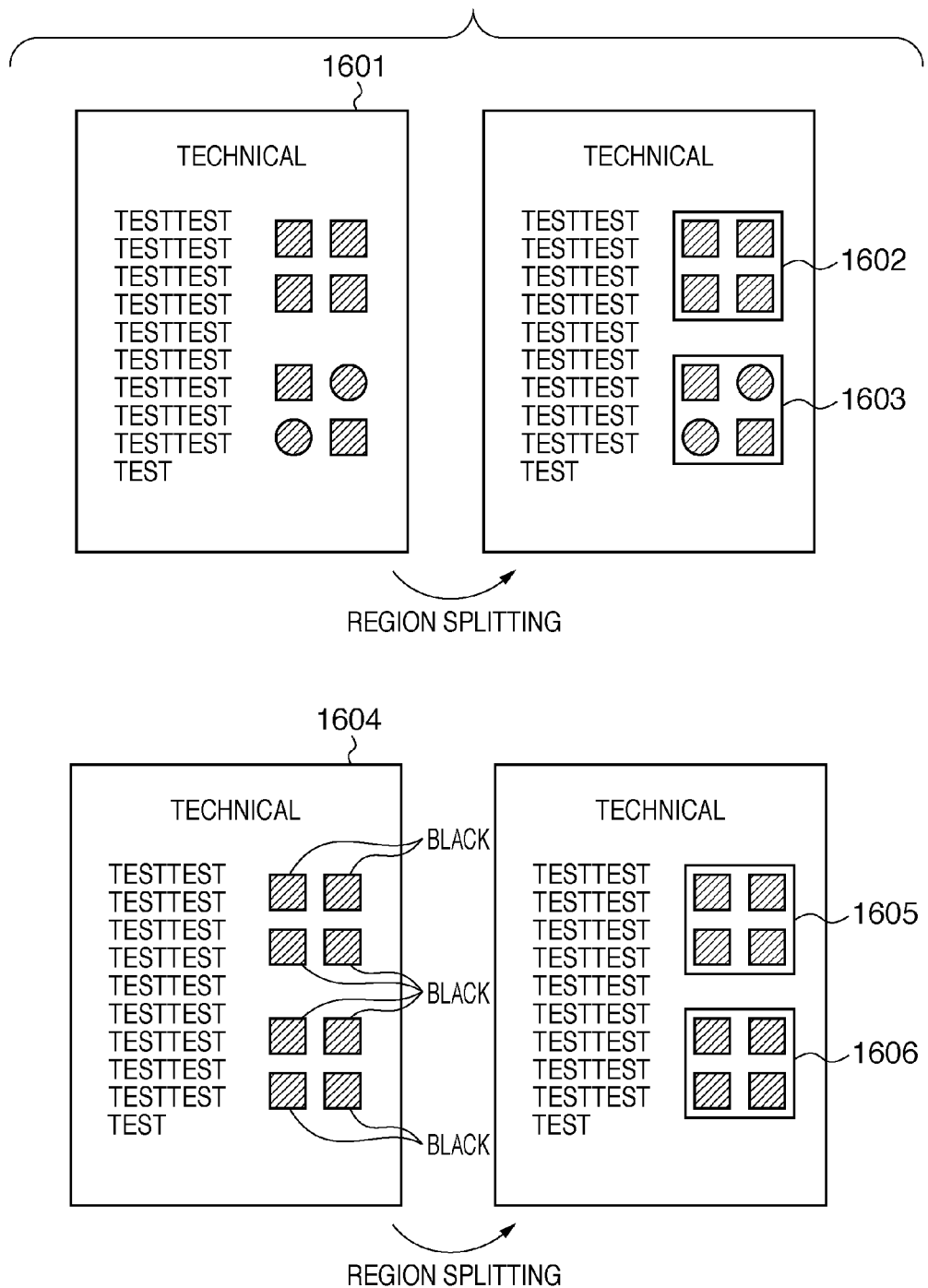
FIG. 16 is a diagram illustratively showing region splitting based on a feature quantity of an image.

FIG. 16 is a diagram illustratively showing region splitting based on a feature quantity of an image.

Reference numeral 1601 denotes image data to be input, reference numerals 1602 and 1603 denote a result of region splitting when an original of 1601 is input. The "image" attribute is added to regions 1602 and 1603. Here, the interior of the regions 1602 and 1603 is analyzed, and if the regions are constituted from the same images (objects), region re-extraction is not performed. Note that if a region is constituted from different images (objects), region re-extraction may be performed.

For example, it is determined that the region 1602 includes images having the same shape (four square images), and the region 1603 includes images having different shapes (square images and circle images coexist).

Reference numeral 1604 denotes different image data from reference numeral 1601, and regions 1605 and 1606 denote a result of region splitting when an original of 1604 is input. The "image" attribute is added to the regions 1605 and 1606. Here, the interior of the regions 1605 and 1606 is analyzed, and if the region is constituted from images having a single color, region re-extraction may not be performed, and if the region is constituted from images having different colors, region re-extraction may be performed.

For example, it is determined that the region 1605 is constituted from images having a single color (four square images are all black), and the region 1606 is constituted from images having different colors (among four square images, two square images in the upper row are black, and two in the lower row are blue).

As described above, grouping based on a feature quantity of an image (object) within a region can also be performed.

Other Exemplary Embodiment

The exemplary embodiments of the present invention were described above in detail; however, the present invention may be applied to a system constituted from a plurality of devices or may be applied to an apparatus constituted from one device.

It should be noted that the present invention may also be accomplished by supplying directly or remotely a program that realizes the functions of the aforementioned exemplary embodiments to a system or an apparatus, and by the system or apparatus reading out and executing the supplied program code. Therefore, the technical scope of the present invention also includes the program code itself installed on a computer so as to realize the functional processing of the present invention on the computer.

In this case, the program may take any form and may be an object code, a program to be executed by an interpreter, script data supplied to an OS, and so on as long as it has the functionality of the program.

Examples of a computer-readable recording medium for supplying the program include a floppy (registered trademark) disk, a hard disk, an optical disk (CD, DVD), a magneto-optical disk, magnetic tape, a non-volatile memory card, a ROM, and so on.

Moreover, the functions of the aforementioned exemplary embodiments can be realized by the computer executing the read-out program. In addition, an OS or the like running on the computer may perform part or all of the actual processing based on instructions in the program, and the functions of the aforementioned exemplary embodiments may also be realized through that processing.

Furthermore, the program read out from the recording medium may be written into a memory provided in a function expansion board inserted into the computer or a function expansion unit connected to the computer. Thereafter, a CPU or the like included in the function expansion board or function expansion unit may perform all or part of the actual processing based on instructions included in the program, and the functions of the aforementioned embodiments may be realized through that processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-122776, filed May 8, 2008 which is hereby incorporated by reference herein in its entirety.

What is claimed is:

1. An image processing apparatus comprising:
an input unit for inputting image data;
a detection unit that detects object images included in the input image data;
a first determination unit that determines an object attribute for each of the detected object images;
an addition unit that adds the determined object attribute to a corresponding object image;
a second determination unit that determines, for an object image to which a "graph" or "image" attribute has been added, whether an object image to which a "caption" attribute has been added accompanies the object image to which a "graph" or "image" attribute has been added; and
a storage control unit that
for an object image having a "graph" or "image" attribute which is determined to be accompanied by an object image having a "caption" attribute, groups the object image having the "graph" or "image" attribute and the accompanying object image having the "caption" attribute, and stores region information regarding the grouped object images in association with the image data for the object images in a storage unit, and
for an object image having a "graph" or "image" attribute which is determined not to be accompanied by an object image having the "caption" attribute, detects another object image included in the object image having the "graph" or "image" attribute by using the detection unit, and stores region information regarding the detected other object image in association with the image data for the detected object images in a storage unit.

2. The image processing apparatus according to claim 1, wherein the first determination unit determines an object attribute based on at least one of a shape of an object image detected by the detection unit and a feature of an image included in the object image.

3. The image processing apparatus according to claim 1, further comprising a generation unit that extracts the grouped object images from the image data and generates one grouped image data item using the extracted grouped object images, wherein the storage control unit also stores the region information and the grouped image data item corresponding to the region information in the storage unit.

4. The image processing apparatus according to claim 1, wherein the region information includes related information regarding the object images so as to enable re-dividing of the grouped object images.

5. The image processing apparatus according to claim 1, further comprising a search unit that searches for object images having a keyword identical with a designated keyword; and
a dividing determination unit that determines, for an object image found by the search unit that includes another object image, whether or not to divide the included another object image from the object image found by the search unit.

6. A method for controlling an image processing apparatus comprising:
an input step of inputting image data;
a detection step of detecting object images included in the input image data;
a first determination step of determining an object attribute for each of the detected object images;
an addition step of adding the determined object attribute to a corresponding object image;
a second determination step that determines, for an object image to which a "graph" or "image" attribute has been added, whether an object image to which a "caption"

attribute has been added accompanies the object image to which a "graph" or "image" attribute has been added;

a first storage control step of grouping, for an object image having a "graph" or "image" attribute which is determined to be accompanied by an object image having a "caption" attribute, the object image having the "graph" or "image" attribute and the accompanying object image having the "caption" attribute, and storing region information regarding the grouped object images in association with the image data for the object images in a storage unit; and a second storage control step of detecting, for an object image having a "graph" or "image" attribute which is determined not to be accompanied by an object image having the "caption" attribute, another object image included in the object image having the "graph" or "image" attribute by using the detection unit, and storing region information regarding the detected other object image in association with image data for the detected object images in a storage unit.

7. A non-transitory computer-readable storage medium storing a computer program for causing a computer to execute a method for controlling an image processing apparatus comprising:

an input step of inputting image data;

a detection step of detecting object images included in the input image data;

a first determination step of determining an object attribute for each of the detected object images;

an addition step of adding the determined object attribute to a corresponding object image;

a second determination step that determines, for an object image to which a "graph" or "image" attribute has been added, whether an object image to which a "caption" attribute has been added accompanies the object image to which a "graph" or "image" attribute has been added;

a first storage control step of grouping, for an object image having a "graph" or "image" attribute which is determined to be accompanied by an object image having a "caption" attribute, the object image having the "graph" or "image" attribute and the accompanying object image having the "caption" attribute, and storing region information regarding the grouped object images in association with the image data for the object images in a storage unit; and a second storage control step of detecting, for an object image having a "graph" or "image" attribute which is determined not to be accompanied by an object image having the "caption" attribute, another object image included in the object image having the "graph" or "image" attribute by using the detection unit, and storing region information regarding the detected other object image in association with image data for the detected object images in a storage unit.

\* \* \* \* \*